April 15, 1941.  H. B. HEYN ET AL  2,238,169
PIPE CONNECTION
Filed Oct. 1, 1938
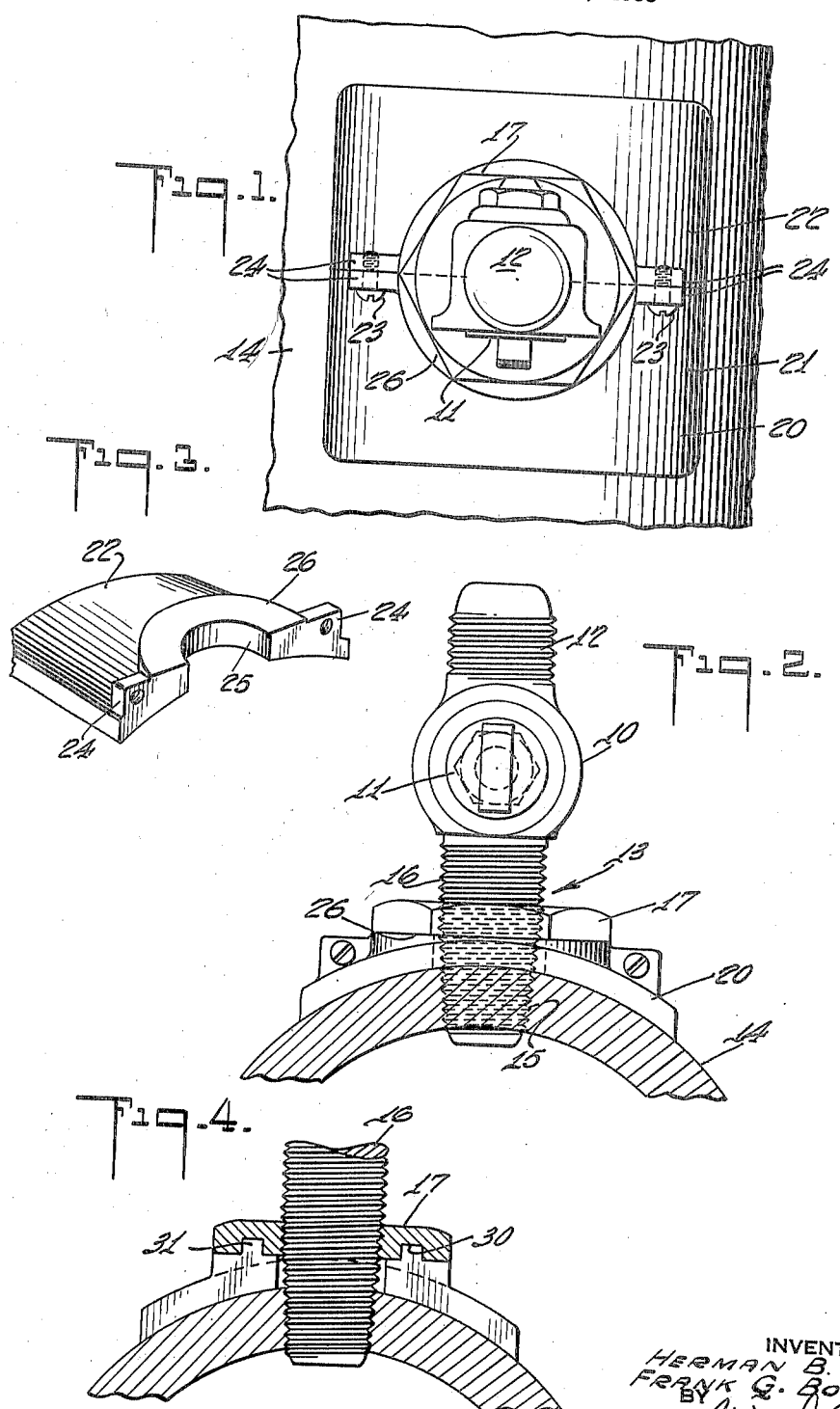
INVENTOR
HERMAN B. HEYN.
FRANK G. BOSCHKE
BY
Virgil C. Kline
ATTORNEY Patented Apr. 15, 1941

2,238,169

UNITED STATES PATENT OFFICE 2,238,169

PIPE CONNECTION

Herman B. Heyn and Frank G. Boschke, Pasadena, Calif., assignors to Johns-Manville Corporation, New York, N. Y., a corporation of New York Application October 1, 1938, Serial No. 232,722

3 Claims. (Cl. 285—39)

The present invention relates to improvements in pipe connections, such as employed between service pipes and mains, tanks, and similar pressure chambers. A conventional connection of this type comprises a "corporation stop" consisting of a nipple-like member in which is incorporated a shut-off cock. The nipple is threaded in a conventional manner for connection with a water main, tank or the like, and for connection with a union or similar means on a service pipe.

Heretofore, particularly where the mains or tanks to which the connections are made have been thin walled or of frangible material, difficulties have been encountered due to the tendency of the threads to strip from the main upon lateral movement of the service pipe or main. Such movements may occur in the normal case by reason of traffic vibrations, movements of earth surrounding the pipes, and the like. It has been proposed to overcome these difficulties by the use of saddles extending around the main and including a portion supporting the corporation stop and reenforcing the connection of the same with the main. Such saddles, however, being expensive in themselves and making unnecessary expensive installations, have not been wholly satisfactory for these and other reasons.

It is an object of the present invention to provide a threaded pipe connection which will include a reenforcing member adapted to distribute any stresses, occurring by reason of vibration or movement of the pipe or main or other device to which the pipe is connected, over a comparatively large area of said main and to thereby relieve the stress on the thread.

It is a further object of the invention to provide a construction of this type which may be easily applied and which is of relatively low cost.

It is a further object of the invention to provide a pipe connection as referred to which can be applied to mains under pressure and in substantially the conventional manner now employed.

Our invention will be fully understood and further objects and advantages thereof will become apparent when reference is made to the detailed description thereof which is to follow and to the accompanying drawing, in which—

Fig. 1 is a plan view of a pipe connection device such as a corporation stop embodying the present invention;

Fig. 2 is an end elevational view of the construction shown in Fig. 1;

Fig. 3 is a perspective view illustrating an element of the construction shown in Figs. 1 and 2, and Fig. 4 is a sectional view, taken on a transverse centerline of the device, of a modification of the construction of Figs. 1 and 2.

Referring now to the drawing, and particularly Figs. 1, 2, and 3, the invention is illustrated as embodied in a corporation stop of basically conventional type. It will be understood, however, that the invention is not to be limited to corporation stops, but that the functions and advantages thereof may be obtained with other types of pipe connections, for example, with those where no stop or valve is employed.

The device illustrated comprises a nipple-like member 10 in which is incorporated a valve structure of any suitable type indicated generally at 11. The member 10 has a threaded end 12 for connection to a union or the like on a service line or other pipe, and an end 13 which includes a tapered threaded portion 15 for engagement with a threaded opening in the wall of a water main or other pressure chamber 14. The portion of the end 13 above the tapered threads is suitably of uniform diameter and carries threads 16 which may be any standard thread. Arranged to be threaded on the portion 16 is a nut 17.

A split yoke 20 is employed which suitably comprises similar halves 21 and 22, one of such similar halves being depicted in Fig. 3, formed of a contour to fit the main or other pressure chamber 14. Each of the halves 21 and 22 includes a semi-circular recess 25 at the center of its inner edge, the recesses, when in adjacent relationship, forming a circular opening of a diameter to fit preferably somewhat loosely around the end 13 of the member 10. The two halves 21 and 22 are held in assembled relationship, in accordance with the preferred form of the invention, by means of suitable studs or screws 23 extending through apertured ears 24 formed in corresponding position adjacent the meeting edges of the yoke halves 21 and 22 and preferably integral therewith. As illustrated, the apertures in ears 24 of yoke half 22 may be internally threaded for engagement with studs 23. It will be readily understood, however, that in lieu of this construction, bolts may be employed which extend completely through the ears and bind the ears of the adjacent yoke halves by means of nuts. Also, any other conventional securing means may be employed in lieu of the bolts or studs referred to. The upper surfaces of the yoke halves are of planar form to provide, when in assembled relationship, a seat 26 for nut 17 as will be later described.

In assembling a corporation stop of the present invention on a water main, for example, the nut 17 is threaded on the end 13 of member 10 and backed up for a substantial distance on the thread 16 to be temporarily out of the way of further operations. After drilling and threading the opening in the main 14, the tapered threaded portion 15 of member 10 is inserted in the opening and screwed down snugly, the tapering configuration of portion 15 causing a compressive force to be exerted on the walls of the main 14 to insure a tight connection. The two halves 21 and 22 of the yoke 20 are then placed on the main and brought together with their recesses 25 opposite and ears 24 adjoining and secured in such assembled relationship by means of studs or bolts 23. The nut 17 is then threaded downwardly to snugly engage seat 26 of yoke 20 to securely bind the same against the pipe.

The pipe connection thus described insures against failure of the threaded connection between the stop and main inasmuch as any tendency toward lateral movement of the stop relatively to the main is resisted by the contact of the yoke with the outer surface of the main. In this way, the stresses created by loads tending to move the service pipe or main are distributed over a substantial area of the surface of the main, rather than being concentrated in the threaded connection. The dimensions of the yoke are suitably provided to obtain the desired reenforcing and strengthening effect. For purposes of illustration only, it may be stated that for use in a main having an internal diameter of 6 inches, the yoke may suitably be 4 inches on a side measured on its horizontal projection. However, such dimensions may be changed to suit the particular conditions of use to which the stop is to be put. For example, where unusual stresses on the service pipe or stop are encountered, a yoke of greater area may be preferably employed.

Referring now to Fig. 4, a slightly modified form of the invention is disclosed. In this modification, the construction is generally the same as that previously described, except that the means for fastening the two halves of the yoke together is constituted by cooperating portions of the yoke halves 21 and 22 and the nut 17, the ears 24 and connecting bolts or the like 23 of the device of Figs. 1 and 2 being omitted. As will be understood from an inspection of Fig. 4, nut 17 according to this embodiment of the invention includes a circular channel or recess 30 in the under side thereof and each half 21 and 22 of the yoke 20 has an upstanding semi-circular rib 31 of substantially the cross sectional dimensions of the groove 30 in the nut. In the application of a corporation stop embodying this form of the invention, similar steps are followed as in the first form, except that two halves of the yoke are brought together and held in assembled relationship, for example by a manual operation, until the nut 17 is turned downwardly on the threads 16 to a sufficient extent that its channel 30 embraces the semi-circular ribs 31 of the yoke halves. During further downward movement of the nut 17, separation of the yoke halves are prevented by the cooperation of the groove 30 and ribs 31. When the nut 17 is tightened snugly, the entire construction is held in firmly assembled relationship as will be readily observed.

A device in accordance with the present invention, in either of the forms described above, serves admirably to overcome the disadvantages of previously known connections. The device is particularly suitable for use with pipe such as that made of a hardened compressed asbestos-cement composition, but it will be understood that similar advantages will be obtained where the stops are employed with other types of pipes or mains.

Where the pipe connection of the present invention is employed, in case of any lateral motion of the main or of the pipe attached to the corporation stop, the load is transferred to the bracing yoke and, in turn, to the main itself, and thereby substantially eliminates lateral pressure upon the threads within the main. The stop of the present invention enables the use of a saddle or the like to be completely eliminated in most instances and thereby effects a very considerable saving. A further advantage of the construction of the present invention resides in the fact that an increase in the diameter of the main does not require a proportionate increase in the size of the yoke, as is the case where saddles are employed.

A further advantage of the improved corporation stop in accordance with the invention is its applicability for use in a standard machine for tapping pipes and making connections under pressure. Thus, the main may be drilled and threaded, and the cock, with the nut 17 in position, be inserted with the usual pressure tapping machine.

In the event the corporation stop is to be applied to a main or the like not under pressure, a somewhat simplified construction may be employed, while retaining the principal advantages of the invention. Namely, the yoke may be made as a single element with a central aperture therein for the reception of the end 13 of member 10. In the assembly of this form of the device, after the nut 17 is backed up on the thread 16, the end 13 of member 10 is inserted through the aperture of the yoke and the assembly then secured to the main or the like by screwing the threaded portion 15 of member 10 tightly in the threaded aperture in the main. The nut 17 is then turned downwardly as before to bind the yoke against the main.

Having thus described our invention in rather full detail, it will be understood that these details need not be strictly adhered to but that various changes and modifications will suggest themselves to one skilled in the art, all falling within the scope of the invention, as defined by the subjoined claims.

What we claim is:

1. A corporation stop for application to a curved wall of a pressure chamber comprising a threaded portion arranged for engagement with said wall, a rigid split yoke having at least one curved major surface, said yoke arranged when assembled to surround the stop and to engage a substantial area of the curved wall of the pressure chamber with the curved surface of said yoke adjacent the curved wall of said pressure chamber, and means threaded on said stop for binding said yoke against said pressure chamber with said curved surfaces in engagement.

2. A corporation stop for application to a curved wall of a pressure chamber comprising a threaded portion arranged for engagement with said wall, a split yoke formed of rigid members with said members having at least one curved major surface, said yoke arranged to surround the stop and to engage a substantial area of the curved wall of the pressure chamber with the curved surface of said yoke adjacent the curved wall of said pressure chamber, means for holding the yoke in assembled relationship, and a locking unit threaded on said stop for binding said yoke against said pressure chamber with said curved surfaces in engagement.

3. A corporation stop for application to a curved wall of a pressure chamber comprising a threaded portion arranged for engagement with said wall, a split yoke formed of rigid members with said members having at least one curved major surface, said yoke arranged to surround the stop and to engage a substantial area of the curved wall of the pressure chamber with the curved surface of said yoke adjacent the curved wall of said pressure chamber, locking means for holding the yoke in assembled relationship, and a cooperating groove and rib carried by said yoke and said locking means and holding the yoke in assembled relationship.

HERMAN B. HEYN.
FRANK G. BOSCHKE.